INVENTOR.
MURRAY FRIEDEL
ATTORNEY

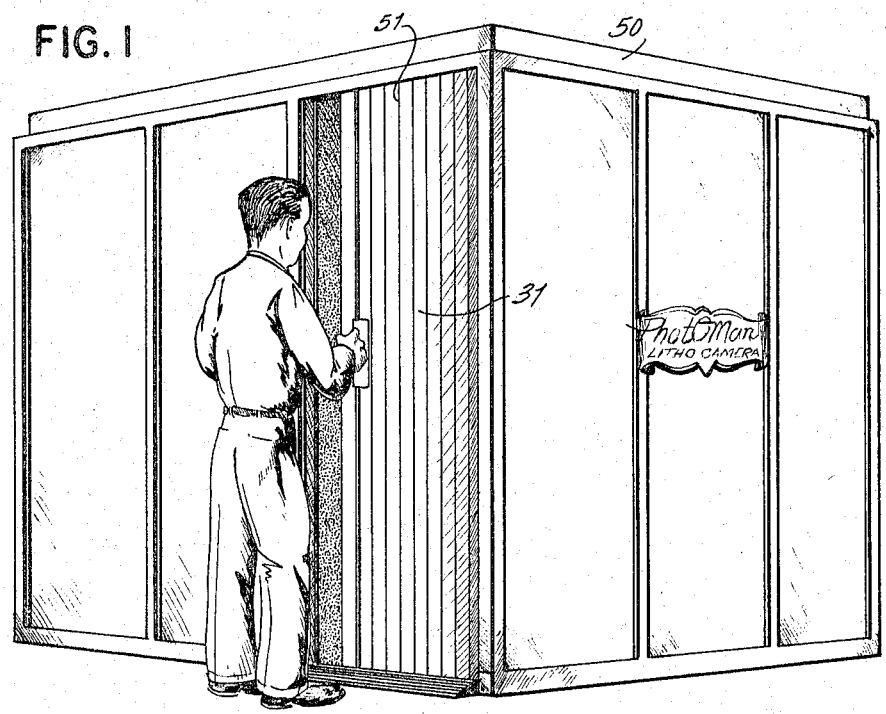
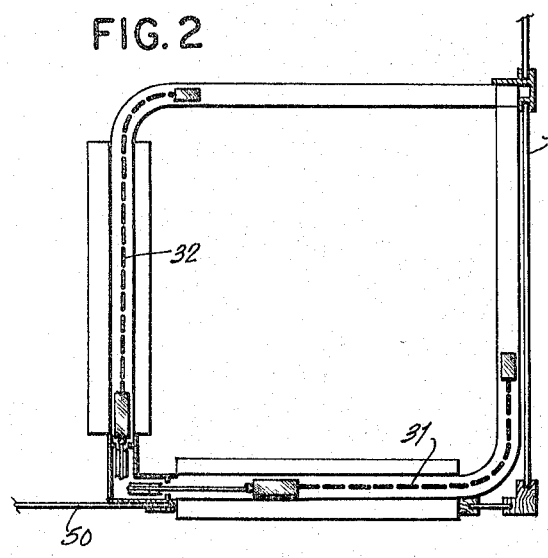
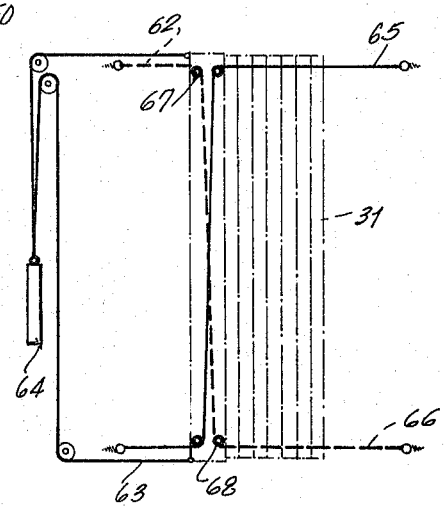

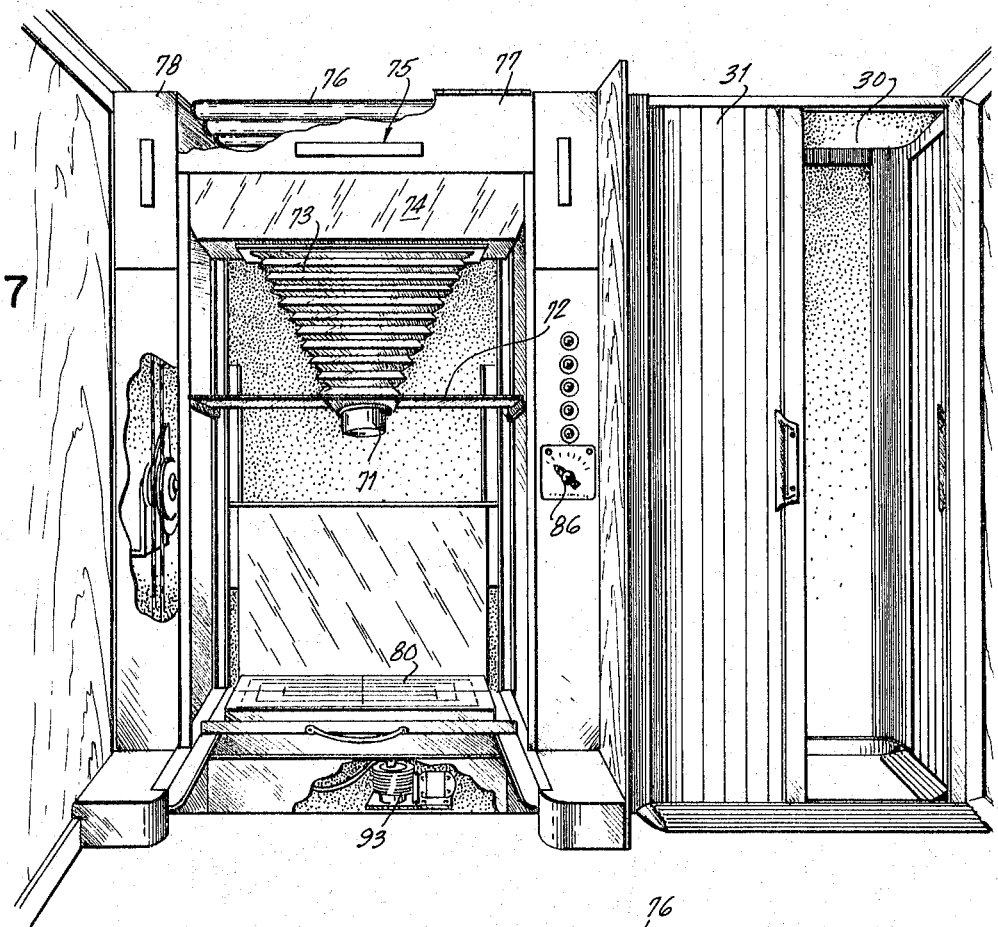
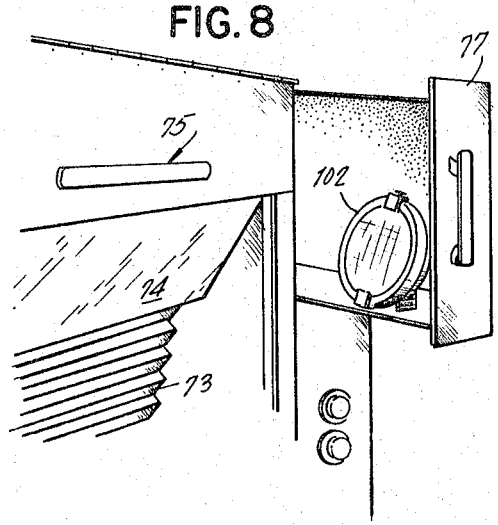 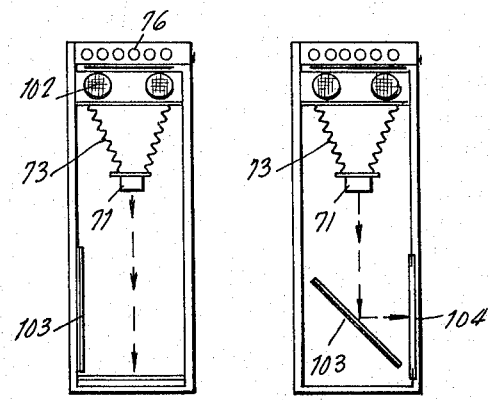

March 14, 1967 M. FRIEDEL 3,308,714
COMBINED PHOTOGRAPHIC ENCLOSURE AND CAMERA
Filed Oct. 20, 1964 6 Sheets-Sheet 4

INVENTOR.
MURRAY FRIEDEL
BY
ATTORNEY

March 14, 1967 M. FRIEDEL 3,308,714
COMBINED PHOTOGRAPHIC ENCLOSURE AND CAMERA
Filed Oct. 20, 1964 6 Sheets-Sheet 5
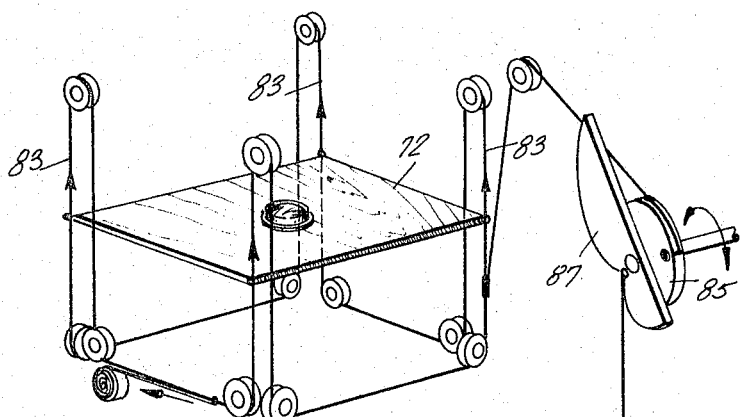
FIG.15
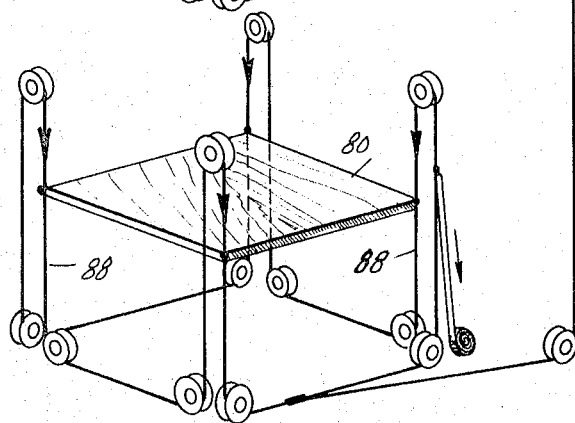
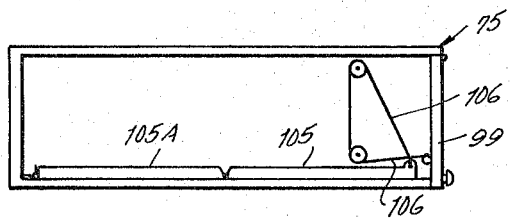
FIG.16
FIG.17
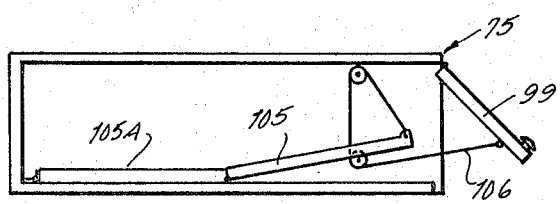
FIG.18
INVENTOR.
MURRAY FRIEDEL
BY
ATTORNEY March 14, 1967 M. FRIEDEL 3,308,714
COMBINED PHOTOGRAPHIC ENCLOSURE AND CAMERA
Filed Oct. 20, 1964 6 Sheets-Sheet 6

INVENTOR.
MURRAY FRIEDEL
BY
ATTORNEY

United States Patent Office

3,308,714
Patented Mar. 14, 1967

3,308,714
COMBINED PHOTOGRAPHIC ENCLOSURE
AND CAMERA
Murray Friedel, North Miami Beach, Fla., assignor to Visual Graphics Corporation, New York, N.Y., a corporation of New York
Filed Oct. 20, 1964, Ser. No. 405,107
9 Claims. (Cl. 88—24)

This invention relates to an integrated photographic enclosure which includes all the features of a darkroom, and an enlarging camera. The invention has particular reference to an enclosure which holds all the equipment necessary for the projection of a photographic image derived from a flat copy sheet which may be either transparent or opaque, upon a light sensitive material.

Most photographic equipment used in copying consists of a camera and a wide variety of specialized equipment to carry out specific assignments. It is common practice to position a sheet to be copied in a frame which is illuminated on one side of a partition or wall while the image is provided by the camera on the other side. The present invention permits an operator to perform a wide variety of photographic tasks within one enclosure. The camera and paper or film handling equipment are automatic and can be adjusted quickly to produce the best results.

An object of the present invention is to provide an improved photographic enclosure which avoids one or more of the disadvantages and limitations of prior art arrangements.

Another object of the present invention is to provide an integrated photographic assembly of all the equipment needed to photograph an object or copy sheet.

A further object of the present invention is to provide an enclosure for photographic equipment having two safety interlocked doors.

A still further object of the present invention is to provide a copying camera having an automatic focusing means which is adjusted to enlarge or reduce the copy.

A feature of the present invention is its detachable lamp units which illuminate the object to be copied.

Another feature of the present invention is its vacuum system to secure a sensitized photographic sheet on an image platen.

A further feature of the present invention is its vacuum adjusting means on a platen vacuum system to apply the vacuum only to the size of the sheet placed upon it.

Another feature of the present invention is its light tight safe for holding unused photographic sheets, ready for use.

Another feature of the present invention includes a reverting mirror which aids an operator in positioning and aligning printed copy.

The invention includes a two compartment darkroom having two interlocking doors arranged so that only one door may be opened at a time. Within the darkroom, a copying camera is positioned within one compartment or cubicle. The camera is provided with an upper compartment containing a copy platen and a plurality of lamps for illuminating the copy therein. The camera lens is secured to a lens board at one end of a bellows and is controlled by a series of cables and cams so that it may be moved into the desired position. An image platen is positioned below the lens and is connected to a vacuum system for holding the light sensitive sheet securely in place.

The invention consists of the construction, combination and arrangement of parts, as herein illustrated, described and claimed.

In the accompanying drawings, forming a part hereof, there are illustrated several forms of embodiment of the invention, in which drawings similar reference characters designate corresponding parts, and in which:

FIGURE 1 is a perspective view of the outside of the camera darkroom.

FIGURE 2 is a plan view of the entrance means to the darkroom showing the outer and inner doors.

FIGURE 3 is a schematic side of view of the system which controls the doors to maintain them in vertical alignment.

FIGURE 7 is an interior in elevation of the photographic enclosure showing the camera bellows, the lamp controls, and the image platen.

FIGURE 8 is a detailed fragmentary view of one of the lamp drawers shown in FIGURE 7.

FIGURES 9 and 10 are schematic side views showing the action of a reflecting mirror to revert an image upon the easel prior to exposure.

FIGURE 15 is a schematic diagram showing the automatic focusing means which positions the lens and the image platen.

FIGURES 16, 17 and 18 are side views of the image platen showing its operation.

Figure 4:
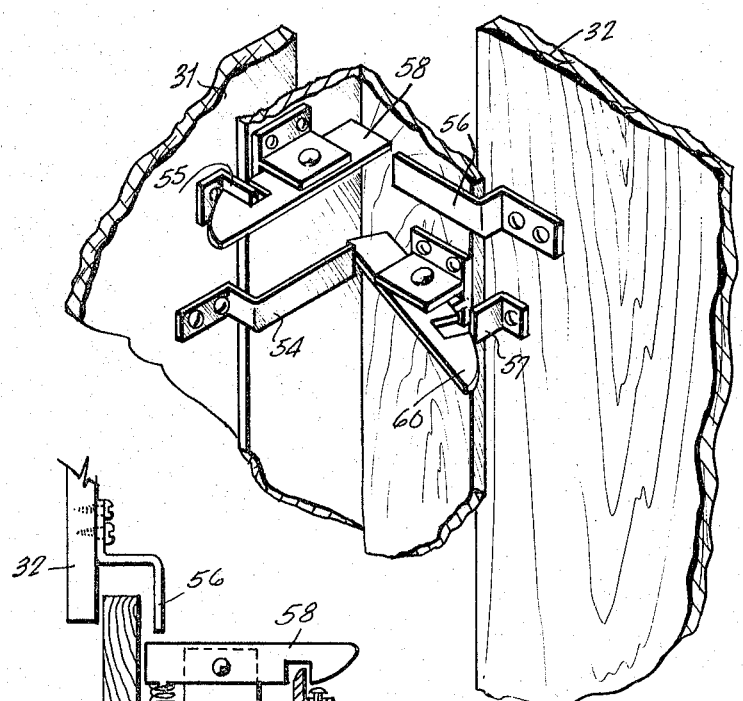
FIGURE 4 is a fragmentary perspective view of the mechanism which permits only one door to be opened at a time.

Referring now to FIGURE 1, the assembly includes a darkroom 50 having the usual four walls and a top, all secured together to form a light tight room. Near one corner of the room is a curtain type door 31, which is preferably made of a plurality of vertical slats secured to each other by flexible sheets. The door may be pushed to one side by operating a handle 52. When door 51 is opened, an operator may enter a small cubicle 30 (see FIGURE 7) which is only big enough to permit the operator to move about in comfort. A second door 32, shown in FIGURE 2, opens from the cubicle 30 into the main portion of the darkroom. As seen in FIGURE 2, the edges of doors 31 and 32 meet when they are closed and at this meeting point latches are provided for insuring that no light can leak into the darkroom area.

The details of this closure means are shown in FIG-

Figure 5:
FIGURE 5 is a plan view of part of the mechanism shown in FIGURE 4.
Figure 6:
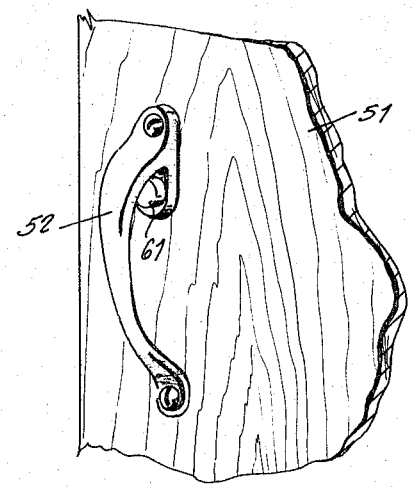
FIGURE 6 is a perspective view of a protective handle which can be used to cover the door latch.

URES 4 and 5, where the first door 31 is provided with a cam 54 and an angle catch 55. The second door 32 is also provided with its cam 56 and its angle catch 57. Two latches 58 and 60 are pivotally mounted on the door jam, each latch containing a cut-out portion for engagement with one of the angle catches on the door. The other end of the latch is positioned so that it will be operated to release the angle catch on one door when the other door is closed. In FIGURE 4 the first door 31 is in its closed position and is locked by latch 58. The cam on the first door has made contact with one end of latch 60 and has rotated it away from the angle catch 57 so that now the second door can be opened. A similar action would occur if the second door 32 were closed. This would open latch 58 and release the first door to the operator. There may be times when both doors are closed and an operator on the outside wishes to open the first door. In this situation the operator pushes a button 61 (see FIGURES 5 and 6) releasing latch 58, and permitting the operator to open the first door 31.

FIGURE 3 shows a cable system used to pull the first door shut in case an operator leaves the door open. Both the top and bottom portions of the door are connected respectively to cables 62 and 63. These cables are directed over a set of pulleys and are secured to a weight 64. In order to keep the door from jamming, a system of alignment cables 65 and 66 may be used. These cables have both ends anchored at points on the panels of the darkroom 50, but one cable 62, shown in dotted lines in FIGURE 3, passes over a pulley 67 on the upper portion of the door 51 and then is passed over a second pulley 68 at the bottom portion of the same panel. Cable 65 is secured in a similar manner and these two cables insure that the door slats in door 51 will always be vertical.

On the inside of the dark room there is a camera 70 having a lens 71 secured to a lens board 72. The lens board also secures one end of a bellows 73 and above the bellows there is an enclosed compartment 74 for housing the material to be copied. The copy in this case is a sheet of material having identifying characters or pictures printed thereon. The copy is positioned within platen 75 which will be described in detail later. If the copy is on a transparent base and can transmit light, a series of fluorescent lamps 76 is positioned above the platen for illuminating it while the print is being made. If the copy is an opaque sheet, a plurality of lamps positioned within compartments 77 and 78 are lighted to illuminate the underside of the copy so that its image is projected upon an image platen 80 positioned directly below lens 71. The lamps and the drawer assembly in compartments 77 and 78 will be described below in detail.

Figure 11:
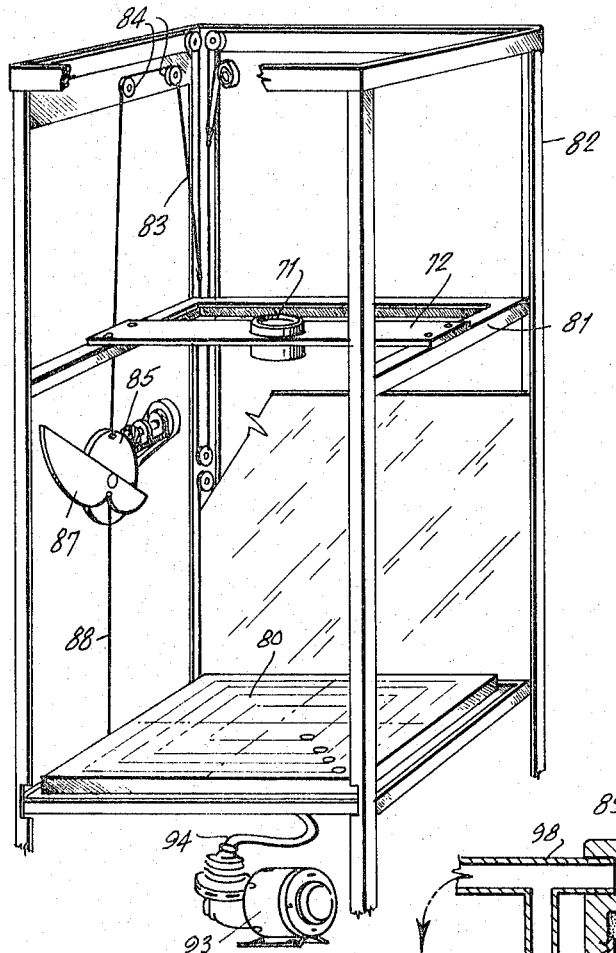
FIGURE 11 is a somewhat isometric skeleton view of the camera frame showing how the focusing cables are controlled by a cam to keep the image in focus.

In order to increase the speed of operation and to reduce the errors of focusing, lens board 72 is connected to a control system for automatic focusing. One of these control arrangements is shown in FIGURE 11, where the lens 71 and the board 72 are connected to a horizontal frame 81, which is movable within a vertical frame 82. The horizontal frame 81 is supported by cables 83 which are passed over pulleys 84 and connected to a wheel 85, which is turned by a control knob 86 (FIGURE 7). The same control knob is coupled to a second cam 87 and a second cable 88 which supports the image platen 80. As the control knob 86 is turned, cables 83 and 88 are either shortened or lengthened and the lens board 72 is moved up or down while the image platen 80 is also moved vertically to a new focusing position. Cams 85 and 87 are so proportioned that the lens 71 and the platen 80 are always maintained in focusing relationship.

FIGURE 15 shows the complete system of cables which are secured to all four corners of the lens board 72 for moving it up or down while maintaining it in a horizontal position. A similar system of cables is secured to the four corners of the image platen 80 for moving it in a similar manner.

Figure 12:
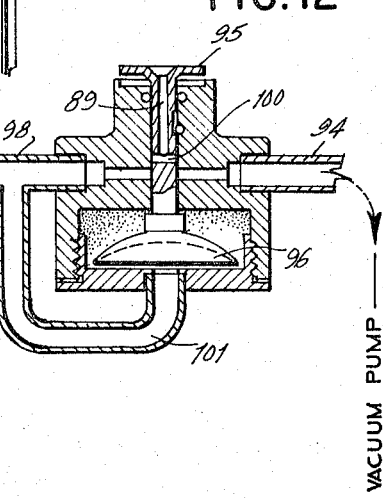
FIGURE 12 is a cross-sectional view of one of the control buttons which operates to turn on a valve in the vacuum system.
Figure 13:
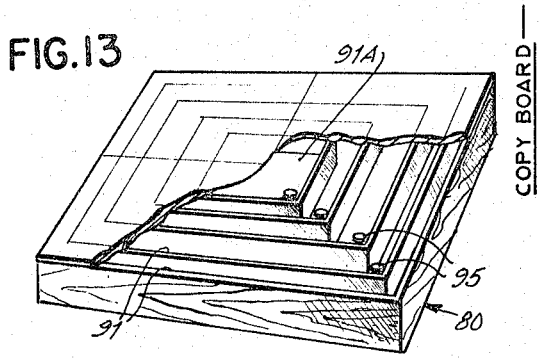
FIGURES 13 and 14 are detailed views of the image platen showing how sections of the platen are cut off when a small image sheet is used.
Figure 14:
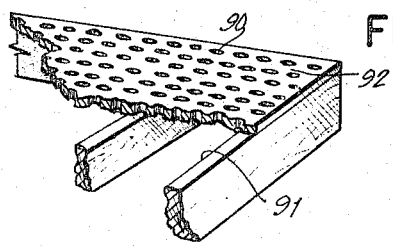

The image platen 80 is shown in detail in FIGURES 13 and 14, and includes a system of oblong or square compartments 91 with a solid bottom, solid sides and a top 92 which is perforated by a plurality of evenly spaced holes 90. The compartments 91 are formed in the shape of hollow rectangles which generally correspond to the sizes of standard photographic papers or films supplied to the photographic industry. Each compartment 91 is connected by a separate flexible conduit 94 to a vacuum source, which includes a vacuum pump 93. At one corner of each compartment there is positioned a control button 95, shown in greater detail in FIGURE 12. This control button may be operated with slight pressure and is used to connect the vacuum source to the compartment associated with the button. The button is coupled by stem 89 to an inverted resilient cup 96 positioned over a portion of the conduit which is connected to the compartment space.

When a small piece of sensitized paper or film is positioned over the central compartment 91A, the operator flattens it upon the platen and depresses the button 95 which is included within the compartments walls. This operation connects the vacuum source conduit to the central compartment by means of a second conduit 98. When the control button 95 is depressed against the resilient action of cup 96, a valve conduit 100 in stem 89 is aligned between the vacuum pump conduit and the image platen conduit 98, thereby sucking the air through conduit 98 and extending the vacuum into branch conduit 101 to retain the resilient cup 96 in its collapsed position. If larger sized papers were used larger compartments would then be covered and similarly connected to the vacuum pump conduit 94. The action of all the valve buttons 95 is similar and by this means a vacuum is applied only to the compartments underlying the particular size of paper or film being used.

The drawer-like compartments 77 and 78, best shown in FIGURES 7 and 8, each contain a plurality of lamps 102 secured to the drawer walls and connected to a plug (not shown) which is disconnected when the drawer is pulled out to the position shown in FIGURE 8. Lamps 102 are for opaque objects which have been deposited in the copy platen compartment 75. It is obvious that when either opaque or transparent projection is employed the image produced on platen 80 is a reversal or a reverted image. This type of image may not be desired for certain operations and for this reason a reverting mirror 103 is positioned at the back of the camera housing so that the operator may move it into a reflecting position as indicated in FIGURES 9 and 10, and thereby throw a true image of the object on a vertically disposed vacuum easel.

The copy platen compartment 75 is shown in cross-section in FIGURES 16, 17 and 18, which illustrate its operation. A transparent copy support 97 forms the bottom of compartment 75. A hinged, transparent pressure plate 105, 105A is carried in compartment 75 upon the support 97. One-half of the pressure plate 105 is hinged to the other half 105A. The front portion of plate 105 is connected to a cable 106, the other end of which is connected to the hinged door 99. When the hinged door 99 is raised, the cable 106 raises the front part of the pressure plate 105 to a position shown in FIGURE 17. At this position the object sheet may be slid about by the operator to provide a more suitable display on the image platen 80. If the copy sheet is to be centered or removed from the copy platen, the door 99 is moved up all the way and both forward portion 105 and the rear portion 105A are raised, thus permitting the entrance or removal of the copy sheet.

Figure 20:
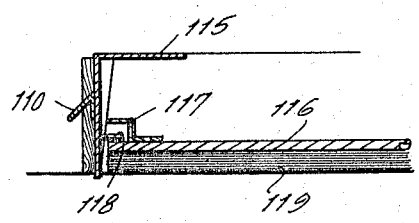
FIGURES 20 and 21 are cross-sectional views showing a portion of a storage safe bin to illustrate its operation.
Figure 21:
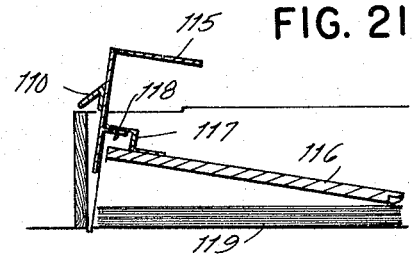

In order for the operator to perform a wide variety of photographic operations without leaving the enclosure, it is necessary to provide a paper safe within which a large quantity of various types of light sensitive paper may be stored. Such a paper safe 107 is shown in FIGURES 19, 20 and 21, and is secured to the wall of the dark room.

The paper safe 107 prevents stray light within the darkroom compartment from reaching the supply of photographic paper during exosures. In addition, the paper safe provides ready access to individual sheets therein as required.

Figure 19:
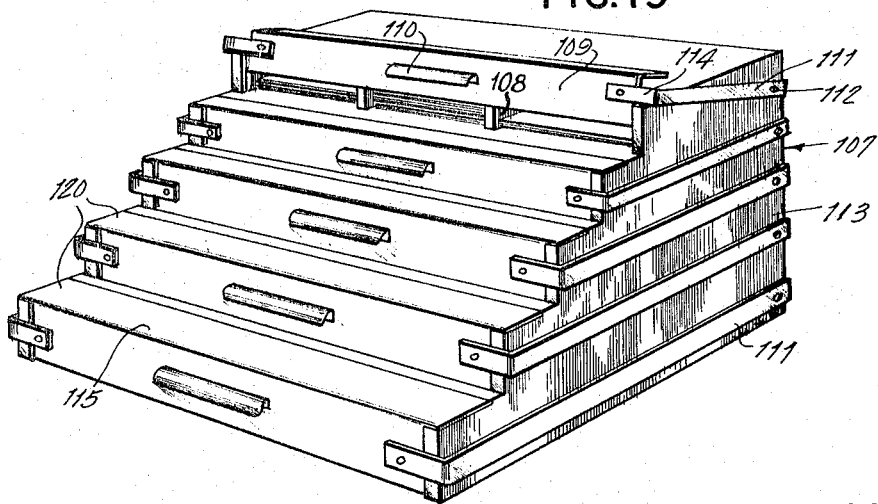
FIGURE 19 is a perspective view of a safe for storing sensitized sheets.

As shown in FIGURE 19, the paper safe 107 is divided into a number of bins 108 to accommodate various sizes and types of light sensitive paper or film, such as are generally used in a photographic processing room. The bins 108 are covered by a door 109 having a handle member 110 on the front thereof. Door supporting arms 111 are pivotally secured at one end as indicated at 112 to the side walls 113 of the safe 107. The opposite ends of the arms 111 are attached to the doors 109 as indicated at 114. It will be seen from an examination of FIGURES 19, 20 and 21, that the arms 111 enable the doors 109 to be raised so that access is given to the paper within the bins 108. When the handles 110 are released, the doors 109 will swing downwardly into their covering position, best shown in FIGURE 20.

Each of the doors 109 is provided with a horizontally disposed top portion 115, which, in addition to forming the top wall of the bin 108 enables the door 109 to be swung upwardly in the manner shown.

A paper hold-down plate 116 is located within each of the bins 108 and overlies the paper supply. The plate 116 prevents the paper from curling and also serves to protect the paper from light leaks. The hold-down plate 116 is provided with brackets 117 which extend outwardly to engage a small projection 118 carried on the inside door 109. When the door 109 is raised, the projection 118 picks up the plate 116 by engaging the bracket 117. When the door 109 is closed the projection 118 releases the bracket 117, and the plate 116 rides upon the top surface of the paper 119 within the safe 107.

In operation the door 109 can be raised by means of the handle 110 and a sheet of paper 119 removed from one of the bins 108, with a one-hand motion if desired.

It will be observed that the paper safe 107 is formed with a stepped configuration as indicated at 120 in order to provide clearance for the top portion 115 of the doors 109.

From the foregoing it will be seen that there has been provided an integrated photographic enclosure assembly capable of a wide variety of photographic operations and occupying a minimum amount of space.

Having thus fully described the invention, what is claimed as new and desired to be secured by Letters Patent of the United States is:

1. A device for copying both opaque and transparent copy materials comprising in combination, a light tight two compartment enclosure, an exterior first door for access to the first of said compartments and an interior second door for access from the first to the second compartment, latch means carried by the enclosure to prevent both doors from being opened at the same time, a camera in the second compartment, said camera comprising a lens board, a camera lens on said lens board, a copy holder above the lens board to receive material to be copied, a light tight bellows connected at one end to the lens board and at its opposite end to the copy holder, means carried by the second compartment to vary the distance between the lens board and the copy holder, means to illuminate the copy in the copy holder, an image platen spaced from the lens board and adapted to receive light coming from the lens, a source of vacuum connected to the image platen and means carried by the said platen to apply the vacuum source to specific areas of the platen.

2. A device according to claim 1, in which the latch means comprise a first latch on the first door, a second latch on the second door and cam means responsive to the operation of each latch whereby opening one latch will lock the other.

3. A device for copying both opaque and transparent copy materials comprising in combination, a light tight two compartment enclosure, an exterior first door for access to the first of said compartments and an interior second door for access from the first to the second compartment, latch means carried by the enclosure to prevent both doors from being opened at the same time, a camera in the second compartment, said camera comprising a lens board, a camera lens on said lens board, a copy holder above the lens board to receive material to be copied, a transparent copy support forming the bottom of the copy holder, a first light source above the copy holder for illuminating translucent copy and a second light source laterally disposed within the copy support and below the copy holder for illuminating opaque copy, a light tight bellows connected at one end to the lens board and at its opposite end to the copy holder, means carried by the second compartment to vary the distance between the lens board and the copy holder, means to illuminate the copy in the copy holder, an image platen spaced from the lens board and adapted to receive light coming from the lens, a source of vacuum connected to the image platen and means carried by the said platen to apply the vacuum source to specific areas of the platen.

4. A device according to claim 1 in which the image platen comprises a hollow rectangular member, side walls enclosing the rectangular member, a bottom for said platen, a foraminous top for the platen and a plurality of partitions within the rectangular member adapted to divide the area within the image platen into discrete chambers.

5. A device according to claim 1 in which the image platen comprises a hollow rectangular member, side walls enclosing the rectangular member, a bottom for said platen, a foraminous top for the platen and a plurality of concentric partitions within the rectangular member adapted to divide the area within the image platen into discrete chambers of increasing size.

6. A device according to claim 1 in which the image platen comprises a hollow rectangular member, side walls enclosing the rectangular member, a bottom for said platen, a foraminous top for the platen and a plurality of partitions within the rectangular member adapted to divide the area within the image platen into discrete chambers and means carried by the platen top to control the vacuum source.

7. A device according to claim 1 in which the image platen comprises a hollow rectangular member, side walls enclosing the rectangular member, a bottom for said platen, a foraminous top for the platen and a plurality of concentric partitions within the rectangular member adapted to divide the area within the image platen into discrete chambers of increasing size, and means carried by the platen top adjacent each of the concentric partitions to control the vacuum source whereby the vacuum is applied to selected chambers.

8. A device according to claim 1 in which the image platen comprises a hollow rectangular member, side walls enclosing the rectangular member, a bottom for said platen, a foraminous top for the platen and a plurality of partitions within the rectangular member adapted to divide the area within the image platen into discrete chambers and value means carried by the platen top to control the vacuum source.

9. A device for copying both opaque and transparent copy materials comprising in combination, a light tight two compartment enclosure, an exterior first door for access to the first of said compartments and an interior second door for access from the first to the second compartment, latch means carried by the enclosure to prevent both doors from being opened at the same time, a camera in the second compartment, said camera comprising a lens board, a camera lens on said lens board, a copy holder above the lens board to receive material to be copied, a light tight bellows connected at one end to the lens board and at its opposite end to the copy holder, means carried by the second compartment to vary the distance between the lens board and the copy holder, means to illuminate the copy in the copy holder, a swingable image platen spaced from the lens board and adapted to receive light coming from the lens, a source of vacuum connected to the image platen and means carried by the said platen to apply the vacuum source to specific areas of the platen, and a reverting mirror swingably carried by the second compartment for a movement into the path of light coming from the lens to revert the image falling upon the platen whereby a true image of the copy may be produced.

References Cited by the Examiner

UNITED STATES PATENTS 2,056,279 10/1936 Kulick _____ 95—66 X
2,993,426 7/1961 Weisman _____ 95—90

NORTON ANSHER, *Primary Examiner.*

R. A. WINTERCORN, *Assistant Examiner.*